(12) United States Patent
Venkat et al.

(10) Patent No.: US 9,152,447 B2
(45) Date of Patent: Oct. 6, 2015

(54) SYSTEM AND METHOD FOR EMULATING SHARED STORAGE

(71) Applicant: NetApp, Inc., Sunnyvale, CA (US)

(72) Inventors: Narayan Venkat, Westford, MA (US); Vivek Venkatesan, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 260 days.

(21) Appl. No.: 13/949,130

(22) Filed: Jul. 23, 2013

(65) Prior Publication Data

US 2015/0033220 A1    Jan. 29, 2015

(51) Int. Cl.
*G06F 9/455* (2006.01)
*G06F 13/00* (2006.01)
*G06F 3/06* (2006.01)

(52) U.S. Cl.
CPC ............ *G06F 9/45541* (2013.01); *G06F 3/067* (2013.01); *G06F 3/0607* (2013.01); *G06F 3/0635* (2013.01); *G06F 3/0664* (2013.01); *G06F 9/45558* (2013.01); *G06F 2009/4557* (2013.01)

(58) Field of Classification Search
None
See application file for complete search history.

(56) References Cited

U.S. PATENT DOCUMENTS 6,718,372 B1 * 4/2004 Bober .......................... 709/217
8,694,636 B2 * 4/2014 Shanbhogue ................. 709/225

OTHER PUBLICATIONS

Howell, Nick, "VSC: The Essential Tool for VMare on NetApp," https://communities.netapp.com/docs/DOC-23811, Retrieved Jul. 16, 2013, 8 pages.
VMare Knowledge Base, "What is Pluggable Storage Architecture (PSA) and Native Multipathing (NMP)? (1011375)", Retrieved Jun. 18, 2013, 3 pages.

* cited by examiner

*Primary Examiner* — Adam Lee
(74) *Attorney, Agent, or Firm* — Cesari and McKenna, LLP (57) ABSTRACT

A system and method of emulating a shared storage device includes determining a storage unit identifier (SUID) associated with a first local storage device in a first node of a distributed computing system, updating a first path handler to intercept storage requests including the SUID and being made on the first node and forwarding the storage requests to drivers for an emulated shared storage device, associating a second local storage device in a second node of the distributed computing system with the SUID, updating a second path handler to intercept storage requests including the SUID and being made on the second node and forwarding the storage requests to the drivers for the emulated shared storage device, and intercepting storage requests including the SUID and being made on the second node and forwarding the storage requests to the drivers for the emulated shared storage device.

17 Claims, 7 Drawing Sheets

SYSTEM AND METHOD FOR EMULATING SHARED STORAGE

TECHNICAL FIELD

The present disclosure relates generally to computing systems, and more particularly to emulating shared storage.

BACKGROUND

Virtual machines (VMs) play an important role in computing solutions and especially in cloud computing. A VM provides a software-based implementation of a hardware system giving the appearance that the VM is a separate stand-alone computer with its own processors, registers, memory, and I/O devices such as storage devices. Like many computers, VMs typically have an operating system running on them in which a user may launch and execute any number of applications. However, VMs provide greater flexibility than separate hardware platforms. As an example, a hardware platform can host multiple VMs with each of the VMs being used to create separate and isolated computing environments. Thus, a single hardware platform can be made to appear as several separate and distinct computers. This makes it possible for that single hardware platform to effectively take the place of many separate hardware platforms subject to processing power and other resource limitations.

VMs also provide flexibility in other ways. Because each VM emulates a hardware environment, each VM on a hardware platform may run a different operating system sometimes referred to as a guest operating system. For example, this allows the same hardware platform to have multiple VMs, each running different versions of Linux™ or Microsoft Windows™. In some cases each of the VMs could be running different operating systems including some VMs running Linux™ and others running Microsoft Windows™. It is even possible for a VM to emulate a completely different hardware system so that the same hardware platform could have some VMs emulating x86 PCs even though the underlying hardware platform is a Macintosh™ computer or some other kind of server. A further advantage of VMs is that they are often not tied to a specific hardware platform and may be moved from one hardware platform to another in a computer system.

The advantages of VMs in a cloud computing solution are numerous. Because VMs are not physical hardware systems they may be installed or moved to any hardware platform in the cloud. Additional VMs may also be added to and/or removed from the cloud computing environment without having to purchase or shut down hardware platforms. Thus, within reason, a fixed number of hardware platforms in a cloud computing solution may give the appearance of any number of separate computers with separate computing environments. This gives the cloud computing provider the flexibility to add and remove customers, services, and processing capability without having to make hardware changes each time a change in customer, service, or processing capability occurs. The flexibility may even extend to the ability to move or migrate VMs from one hardware platform to another to better manage changes in usages and loads. Additionally, the isolation of the VMs allows each customer or service to have its own separate, isolated, and secure computing environment.

In order to implement a VM, several elements of a hardware system are emulated so that they may be shared between the VMs running on a hardware platform. The most common elements emulated are processors, memory, and input/output (I/O). Other than cases where a VM implements a different hardware platform, emulation and sharing of the processors is generally straight-forward as the processors and registers may be time-shared. Memory is often a bit more complex, but because memory is largely interchangeable and virtual memory systems are well understood, this is generally not a problem. In contrast, I/O presents greater challenges depending on the type of I/O. Computer networking I/O using sharable resources such as local area networks (LANs) like an Ethernet, and wide area networks (WANs) like the internet may generally be time-shared like the processors. Other I/O, such as a computer monitor cannot be easily shared between VMs as two or more VMs cannot easily or legibly use the display at the same time and the short time-sharing intervals of the VMs is not practical for use with computer users. I/O for storage such as disk drives and flash drives typically falls somewhere in the middle as while storage devices may be shared between VMs in much the same way that memory can, the larger capacity of storage devices may introduce extra complications when VMs are migrated between hardware platforms. Storage Area Networks (SANs) and Network-Attached Storage (NAS) and other shared storage solutions are one way of addressing these complications, but they typically require expensive systems that are hosted separately from the hardware platforms on which the VMs are running. SANs and NAS also do not generally address storage devices that are local to a hardware platform.

Accordingly, it would be desirable to provide improved methods and systems for managing storage devices in computing systems with virtual machines.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Management of the various VMs running on a hardware platform or a node is typically managed by a supervisory program, such as a hypervisor. The hypervisor typically runs in or as part of a host operating system that runs directly on the hardware platform without emulation. The hypervisor typically provides a number of device drivers that support use of I/O by the VMs being managed by the hypervisor. The device drivers in the guest operating system in each of the VMs typically forward I/O requests to the device drivers of the hypervisor for handling by the actual hardware of the hardware platform. As an example, an application running in a VM wishing to transmit a network message such as an email message would use the network drivers of its guest operating system to send the message. The network drivers of the guest operating system would then forward the message to the network drivers of the hypervisor, which would then send the message over the network hardware or possibly even over to another VM being managed by the hypervisor. When received by the hypervisor, any response message would be forwarded back to the VM using a reverse of the same process.

Storage requests such as disk drive reads and writes would be handled similarly with the device drivers of the hypervisor acting as an intermediary or proxy for the VMs and guest operating systems. The storage devices associated with the storage requests are typically identified using a storage unit identifier (ID) or unit number. Storage requests for local storage devices such as disk drives, flash drives, and memory drives that are part of the node may be handled directly by the device drivers of the hypervisor. Storage requests for a network storage device, such as a SAN or NAS, are typically forwarded by the device drivers of the hypervisor over a network where they are further handled by the nodes where the network storage device is managed or located. The storage unit ID is used by the device drivers of the hypervisor to determine whether the storage request is to be handled by a local storage device or a network storage device and provides the device drivers with access to meta information associated with the storage devices, such as size, type, and location.

In cases where a local storage device is used by VMs within the node and none of those VMs are migrated to another node, the local storage device may be partitioned and used similarly to drives on nodes without hypervisors and VMs. In some cases, though, it may be desirable to add extra security features to keep applications from one VM from being able to access the storage space used by applications from other VMs. However, when a VM that is using a local storage device is migrated from its current or source node to another or target node, that local storage device is not local to the target node and is generally no longer accessible to the migrated VM. Many hypervisors will prohibit the migration of VMs that are using local storage devices One solution may be to copy data from the local storage device in the source node to a new local storage device in the target node. This may be very time consuming and introduce unwanted delays in the migration of the VM. Further, it may be unnecessary as portions of the data on the local storage device may be associated with cached or swap space data that does not have to be migrated.

Other possible solutions involve the use of shared network storage, SANs, or NAS where the data is stored on a shared storage device rather than a local storage device and need not be migrated. This may be undesirable for several reasons. First, shared network storage devices are typically more expensive than local storage devices and may be cost prohibitive. Second, use of shared network storage devices may also defeat the purpose of using local storage devices, such as the reduced access time of local storage devices, thus avoiding networking delays, which may be an important consideration with caching and swap space applications.

In many situations, a better solution may be obtained by balancing the features of shared network storage devices with the advantages of local storage devices. Some hypervisors provide customization plugins for storage drivers. For example, a path plugin may be used to intercept requests associated with particular storage unit IDs and introduce custom handling. This mechanism may be used to direct multiple storage unit IDs to the same storage device, manage and balance network paths to network storage devices, or to share a storage unit ID between separate storage devices. The custom handling may, for example, emulate a shared storage device using local storage devices or allow storage requests for one storage device to be handled by a different storage device. More specifically, the path plugin may be used to assign the same storage unit ID to space allocated on local storage devices in separate nodes, present the local storage devices to the storage drivers as a shared storage device, and handle any migration issues. This solution allows a VM using a local storage device to be migrated from a source node to a target node without causing any issues with the hypervisors on the two nodes as the local storage devices are associated with the same storage unit ID, which is sharable between the two nodes.

Storage requests made by the migrated VM on the target node to the emulated shared storage device may be handled differently, depending upon how the local storage devices are emulated and shared. For example, read quests made on the target node may result in notifications to the VM similar to a cache miss. In other examples, the read requests may be fully or partially redirected to the local storage device on the source node depending on whether the data on the local storage device of the source node is to be moved to the local storage device of the target node.

This solution also has applicability beyond the migration of VMs between nodes. For example, emulated shared storage devices may be used to replace real shared storage devices in test environments where it may be impractical or cost prohibitive to use real shared storage devices.

Figure 1:
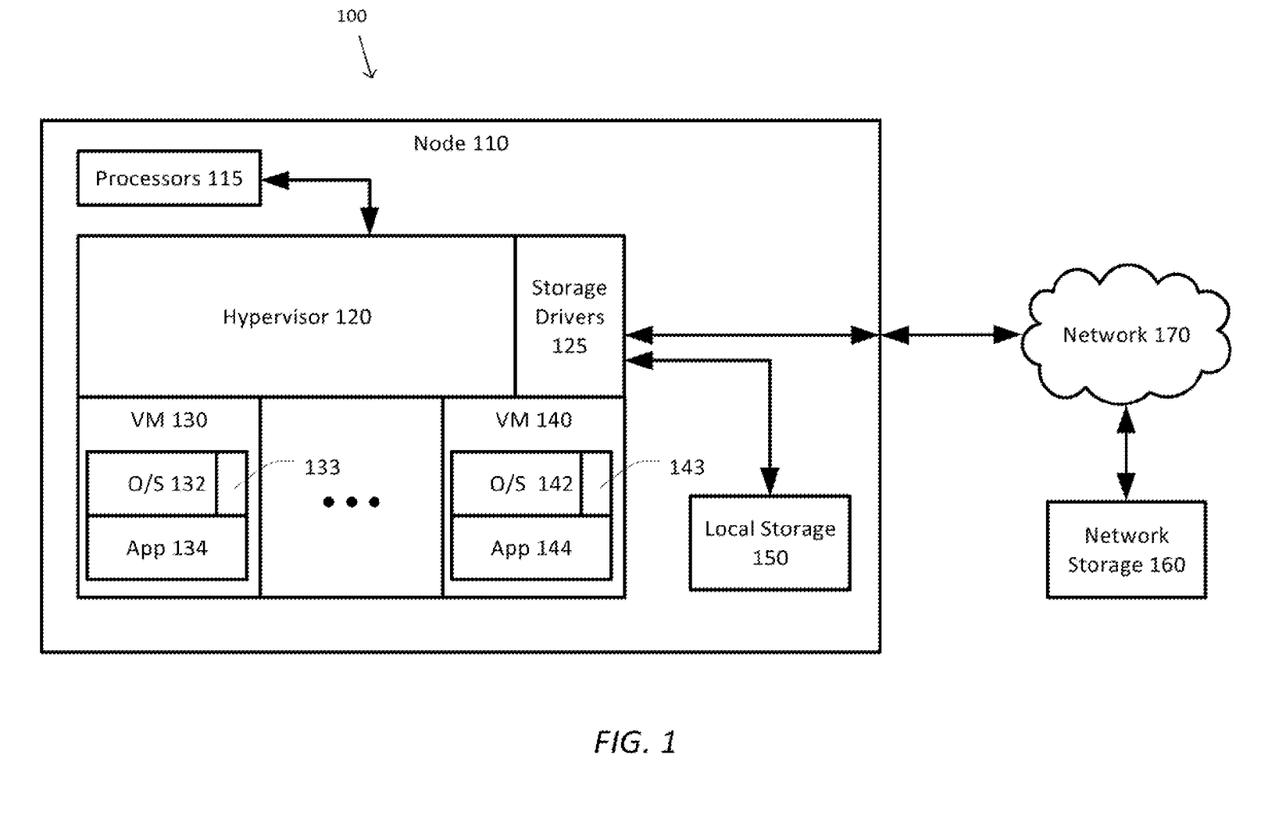
FIG. 1 is a simplified diagram of an example computing system according to some embodiments.

FIG. 1 is a simplified diagram of an example computing system 100 according to some embodiments. As shown in FIG. 1, computing system 100 includes a node 110. Further, even though computing system 100 is shown with one node, computing system 100 may include any number of nodes as might commonly be found in a distributed computing system or a cloud computing environment.

Node 110 includes one or more processors 115 coupled to memory (not shown). In some examples, the one or more processors 115 may control operation and/or execution of software modules and hardware devices on node 110. The memory may be used to store any number of software modules either prior to, during, or after execution.

The memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown in FIG. 1, node 110 is being used as a hardware platform for VMs. More specifically, the one or more processors 115 are being used to execute a hypervisor 120 and its associated storage drivers 125. Hypervisor 120 may be any VM monitor, such as VMware™, Hyper-V™, and the like. As shown, hypervisor 120 is managing two VMs, VM 130 and VM 140, although it would be understood that hypervisor 120 may manage any number of VMs as long as node 110 includes sufficient resources to handle them.

VM 130 includes an operating system 132 and is being used to execute one or more applications 134. Operating system 132 may be any operating system capable of running in a VM as a guest operating system, such as UNIX, Linux™, Microsoft Windows™, and the like. The one or more applications 134 may be any kind of service, utility, application, or program. For example, the one or more applications 134 may include a web and/or database server. Similarly, VM 140 includes an operating system 142 and one or more applications 144.

FIG. 1 also shows different types of storage devices that may be accessed by VMs 130 and 140 in node 110. A local storage device 150 is part of node 110. Local storage device 150 may be any type of disk drive, flash drive, magnetic storage device, optical storage device, memory storage device, or the like. The memory storage device may include flash memory, RAM, static RAM (SRAM), dynamic RAM (DRAM), non-volatile RAM (NVRAM), or the like. Local storage device 150 is considered local because it may be coupled to node 110 using a local bus. For example, local storage device 150 may be coupled to node 110 using a USB, SCSI, PCIe, or other bus used to couple storage devices to computer systems. Local storage device 150 may also be considered to be local to node 110 because it is accessible through the hardware and software of node 110, such as through the storage drivers 125.

In contrast to local storage device 150, node 110 and the VMs 130 and 140 may also access network storage device 160 located in other nodes (not expressly shown) in computing system 100. Network storage device 160 may be a SAN, NAS, or other networkable storage. In some examples, network storage device 160 may be distributed across multiple storage devices on multiple nodes or servers. Network storage device 160 is coupled to node 110 via a network 170. Network 170 may be any type of network, including a LAN, such as an Ethernet, or a WAN, such as the internet.

Although computing system 100 is shown with two storage devices, it would be understood that computing system 100 may include any number of storage devices. For example, node 110 may include more than one local storage device and more than one network storage device may be coupled to node 110 using network 170 or some other network.

Software executing in VMs 130 and 140, such as applications 134 and 144 and operating systems 132 and 142, may access local storage device 150 and network storage device 160 with the aid of hypervisor 120. Like other hardware on node 110, local storage device 150 and network storage device 160 are typically emulated in VMs 130 and 140. This means that the software executing in VMs 130 and 140 generally access the storage devices 150 and 160 using storage drivers 133 and 143 of operating systems 132 and 142, respectively. Because the software executing in VMs 130 and 140 generally do not know they are operating within a VM, the software accesses the storage devices 150 and 160 using the same storage drivers 133 and 143 in the same way as the software would access storage devices 150 and 160 in the absence of the VMs. To distinguish between storage devices 150 and 160, a storage unit ID is generally provided that is able to differentiate between the two storage devices. For example, local storage device 150 may be assigned a storage unit ID of 150 and network storage device 160 may be assigned a storage unit ID of 160. In some examples, the storage unit IDs may also be referred to as logical unit numbers (LUNs).

However, in the VM environment, the storage drivers 133 and 143 of operating systems 132 and 142 generally do not access the storage devices 150 and 160 themselves, but rather pass any access requests through hypervisor 120 and its storage drivers 125 as a proxy. These access requests may include read, write, and informational requests for storage device information. The storage device information may include meta information, such as storage device type and other characteristics. When the storage drivers 125 receive the access requests from the VMs they may use the storage unit IDs or information derived from them to identify the desired storage device, select a suitable driver, and select a path to reach the desired storage device. In the case of local storage device 150, the selected path may include identifying and using the local bus to which local storage device 150 is coupled. Similarly, in the case of network storage device 160, the selected path may include identifying a network address for a server providing access to network storage device 160 and then directing one or more network messages through network 170 to the server. In order to support this path selection, hypervisor 120 and/or the storage drivers 125 may maintain one or more data structures recording access information associated with the storage devices 150 and 160.

Figure 2:
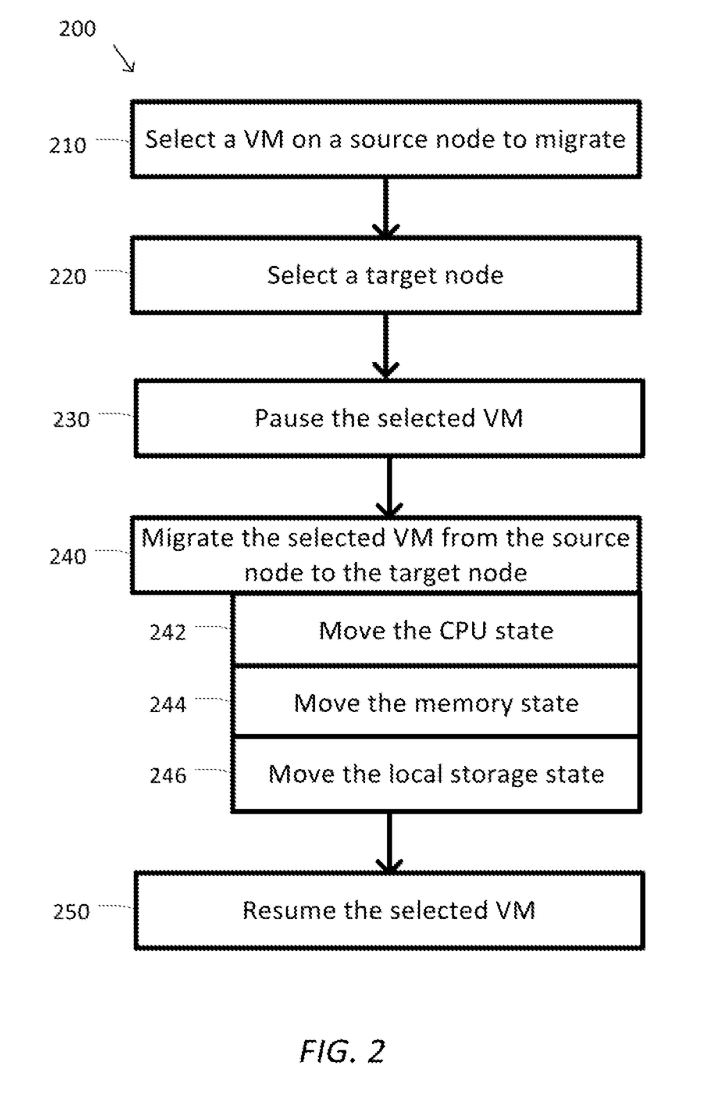
FIG. 2 is a simplified diagram of an example method of VM migration according to some embodiments.

FIG. 2 is a simplified diagram of an example method 200 of VM migration according to some embodiments. One or more of the processes 210-250 of method 200 may be implemented, at least in part, in the form of executable code stored on non-transient, tangible, machine readable media that when run by one or more processors (e.g., the one or more processors 115) may cause the one or more processors to perform one or more of the processes 210-250.

At a process 210, a VM on a source node is selected for migration. For example, when node 110 is the source node, any one of the VMs 130 or 140 may be selected. The VM may be selected to improve load balancing between the nodes of a computing system or to make more computing resources available on the source node for use by the other VMs on the source node or for a new VM to be started on the source node. In some cases, each of the VMs on the source node may be selected so that maintenance may be performed on the source node with minimal interruption to the services being provided by the VMs. The VM may additionally be selected using an automated or partially automated process.

At a process 220, a target node is selected. Another node in the computing system is selected as the new host for the selected VM and becomes the target node. For example, the target node may have a greater availability of computing resources than the source node.

At a process 230, the selected VM is paused. Because it is generally not practical to migrate a VM that is actively running, the selected VM is paused before it is migrated. The selected VM may be paused by suspending further execution of the operating system and the applications in the selected VM. In some circumstances, it may also be useful to complete any pending or in progress I/O requests being processed on behalf of the selected VM. For example, the hypervisor managing the selected VM on the source node may be used to pause the selected VM.

At a process 240, the selected VM is migrated from the source node to the target node. Like non-emulated computers and hardware platforms, the status of a VM is defined by its current state. In general, the current state includes the state of the CPU, the state of the memory, and the state of the local storage. In some cases, the current state may further include the state of other I/O devices, the state of those other I/O devices may not typically be preserved or migrated.

At a process 242, the CPU state is moved. The CPU state may include the state of the registers in the CPU including program counters, stack pointers, status registers, and other general purpose registers. These may typically be migrated by copying the values in each of the registers from their virtual counterparts in the source node to their corresponding virtual counterparts in the target node. In most cases, migration of the CPU state includes a limited number of values and is generally a small portion of the cost of migrating the source VM.

At a process 244, the memory state is moved. The contents of the memory on the source node being used by the selected VM are copied to the memory on the target node. This generally includes the software loaded into the memory as well as values of any variables and data structures being used by the operating system and the applications being executed in the selected VM. In many cases the contents of both the main memory as well as the virtual memory on the source node being used by the selected VM are copied, even when portions of the virtual memory may be stored in swap space located on a storage device. The contents of the cache memory in the source node are less likely to be moved to the target node as part of the memory state. Although the amount of memory locations in the memory state may be large, it is generally reasonable to copy those locations to the target node to allow for migration of the selected VM.

At an optional process 246, the local storage state is moved. Because local storage devices are generally accessible just to the node on which they reside, in order for data on a local storage device on the source node to be accessible to the selected VM after its migration to the target node, the contents of the local storage devices being used by the selected VM should be copied to target node. Because of the generally larger size and slower access times of local storage devices in comparison to memory, waiting to copy the contents of local storage devices may introduce an unacceptably long delay during migration of the selected VM. Further, it may be unnecessary to move much of the data on the local storage devices because portions of that data may be associated with cached data from network storage devices that is still available from the network storage devices. Other portions of that data may also include swap space storage that may have been previously moved as part of the memory state moved during process 244.

Movement of the local storage devices may also result in errors with the hypervisor and the storage drivers in the target node. After migration, the operating system and the applications in the selected VM will continue to access storage devices using the same storage unit IDs the applications used before the migration. Unfortunately, the storage drivers of the hypervisor on the target node may not be able to provide access to the referenced storage devices unless those storage devices are accessible as shared storage devices. Because local storage devices from the source node are not generally shared, the hypervisor and storage drivers of the target node are not able to provide access to local storage devices on the source node after migration. Even when the local storage state is moved from the source node to the target node, the hypervisor of the target node may not create new local storage devices with the same storage unit IDs as this would violate the requirement that storage unit IDs are unique. Further, it may not be possible or even practical to assign new storage unit IDs to the local storage devices and update the operating system and applications of the selected VM to refer to the new storage unit IDs.

Limiting migration of VMs to VMs that just access shared storage devices may unreasonably restrict the migration of VMs. The use of local storage devices in a VM may provide benefits not obtainable using shared storage devices. For example, most shared storage devices are network storage devices, such as SANs or NAS, and are accessed through a network. This introduces delays when accessing these shared storage devices due to network transfer times, lost packets, and the like. Limiting VMs to these shared storage devices may limit the ability of the VMs to use local storage devices as caching devices for network and shared storage devices. It may further make VM migration cost prohibitive as shared storage devices are generally significantly more expensive than other storage devices including local storage devices. Consequently, it would be advantageous to support VM migration with VMs that access and use local storage devices.

At a process 250, the selected VM is resumed. After migration of the selected VM is complete, it may be resumed so that it may begin providing services from the target node. For example, the hypervisor managing the selected VM on the target node may be used to resume the selected VM.

The scope of embodiments is not limited to the processes shown in FIG. 2. According to certain embodiments, the method 200 of VM migration can be performed using variations among the processes 210-250 as would be recognized by one of ordinary skill in the art. In some examples, the process 246 is optional and may be omitted.

Figure 3:
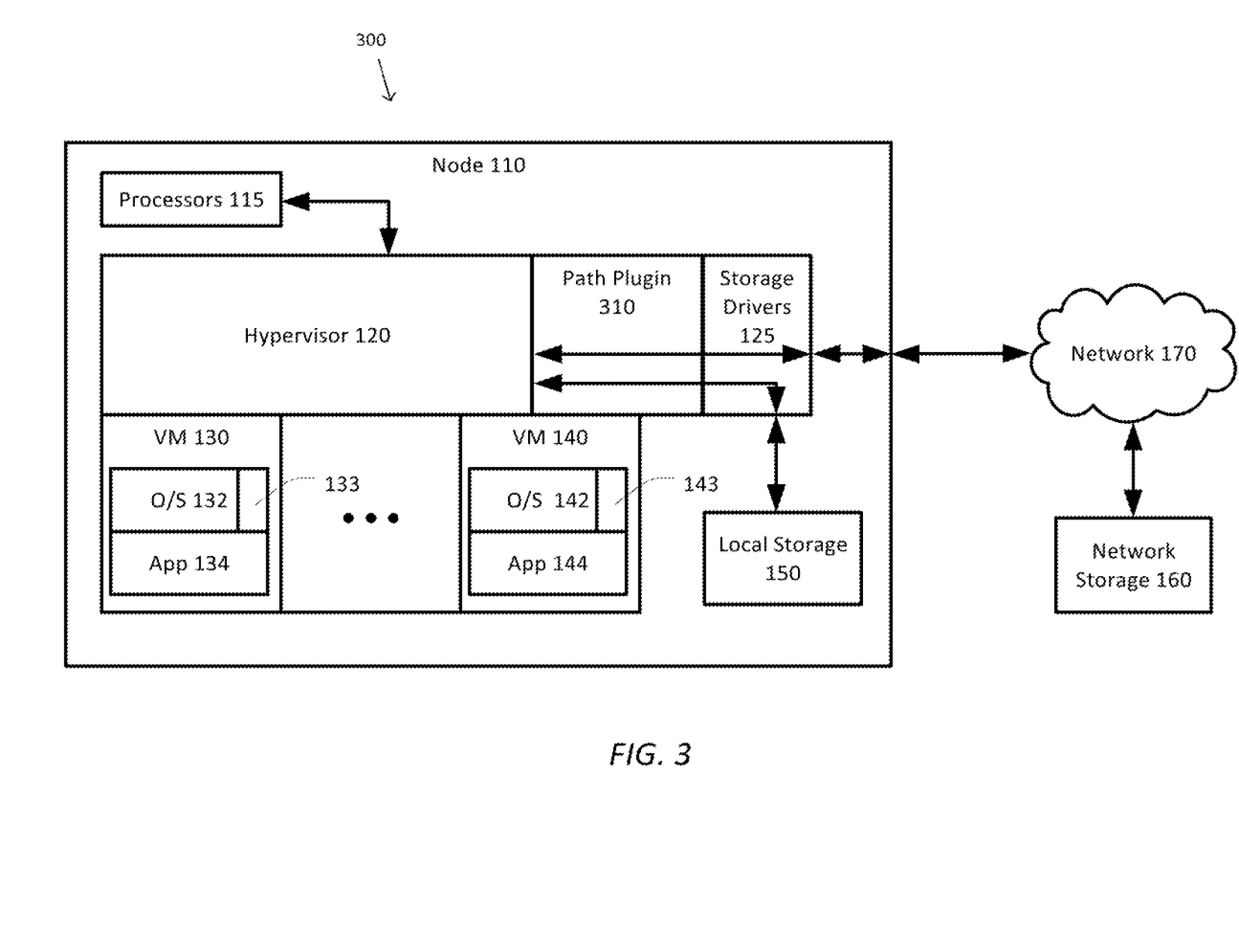
FIG. 3 is a simplified diagram of an example computing system according to some embodiments.

FIG. 3 is a simplified diagram of an example computing system 300 according to some embodiments. As shown in FIG. 3, computing system 300 is largely the same as computing system 100. Computing system 300 includes node 110 with the one or more processors 115 executing hypervisor 120 that is hosting VMs 130 and 140. Hypervisor 120 also includes storage drivers 125 for accessing local storage device 150 and network storage device 160. Computing system 300, however, differs from computing system 100 by the inclusion of a path plugin 310.

Hypervisor 120, like many hypervisors, may include a path plugin, like path plugin 310, for customizing the processing and handling of multiple paths to storage devices such as storage devices 150 and 160. For example, the VMware™ vSphere™ hypervisor includes a special kernel framework called Pluggable Storage Architecture™ (PSA) that provides a framework to develop a path plugin. In some implementations, the path plugin may include a collection of application programming interfaces (APIs) that allow developers to add custom processing and handling to storage requests.

Using path plugin 310, any accesses to storage devices 150 and 160 may be intercepted so that custom processing may be added to the default handling performed by storage drivers 125. For example, the storage unit ID associated with each storage device access may be used to determine when the default processing for the access is to occur or whether custom processing may be used instead. Path plugin 310 may provide many customizations to storage device processing. For example, path plugin 310 may be used to provide additional load balancing functionality that manages different paths through network 170 to network storage device 160. Path plugin 310 may also provide failover support for storage devices 150 and 160.

Using path plugin 310, a custom path handler may be inserted between hypervisor 120 and storage drivers 125. The path handler may be associated or registered with the path plugin and associated with the storage unit ID by a storage manager or a storage controller, such as the NetApp Virtual Storage Console (not shown), plugin to VMware™ vSphere™. Thus when a storage request is received by path plugin 310, path plugin 310 may use a storage unit ID included in the storage request and forward the storage request to the path handler previously associated with the storage unit ID and registered with path plugin 310. The path handler may then respond to the storage request directly or forward it to any appropriate storage driver 125.

Because path plugin 310 may intercept any storage device access based on the storage unit ID and forward it to an associated path handler, path plugin 310 and the path handler may place any façade on a storage device. For example, path plugin 310 may intercept read and write accesses to the storage device as well as informational requests. By intercepting the informational requests, path plugin 310 may use the associated path handler to return any suitable meta information, thus allowing the type and/or other characteristics of the storage device to appear different than they actually are. This allows path plugin 310 to use path handlers to emulate storage devices of other types or even storage devices with other drivers and interfaces. In some examples, path plugin 310 may be used to direct requests associated with multiple storage unit IDs to path handlers that access the same physical storage device or to characterize local storage device 150 as a network storage device. This provides great flexibility in the presentation and handling of storage devices.

Figure 4:
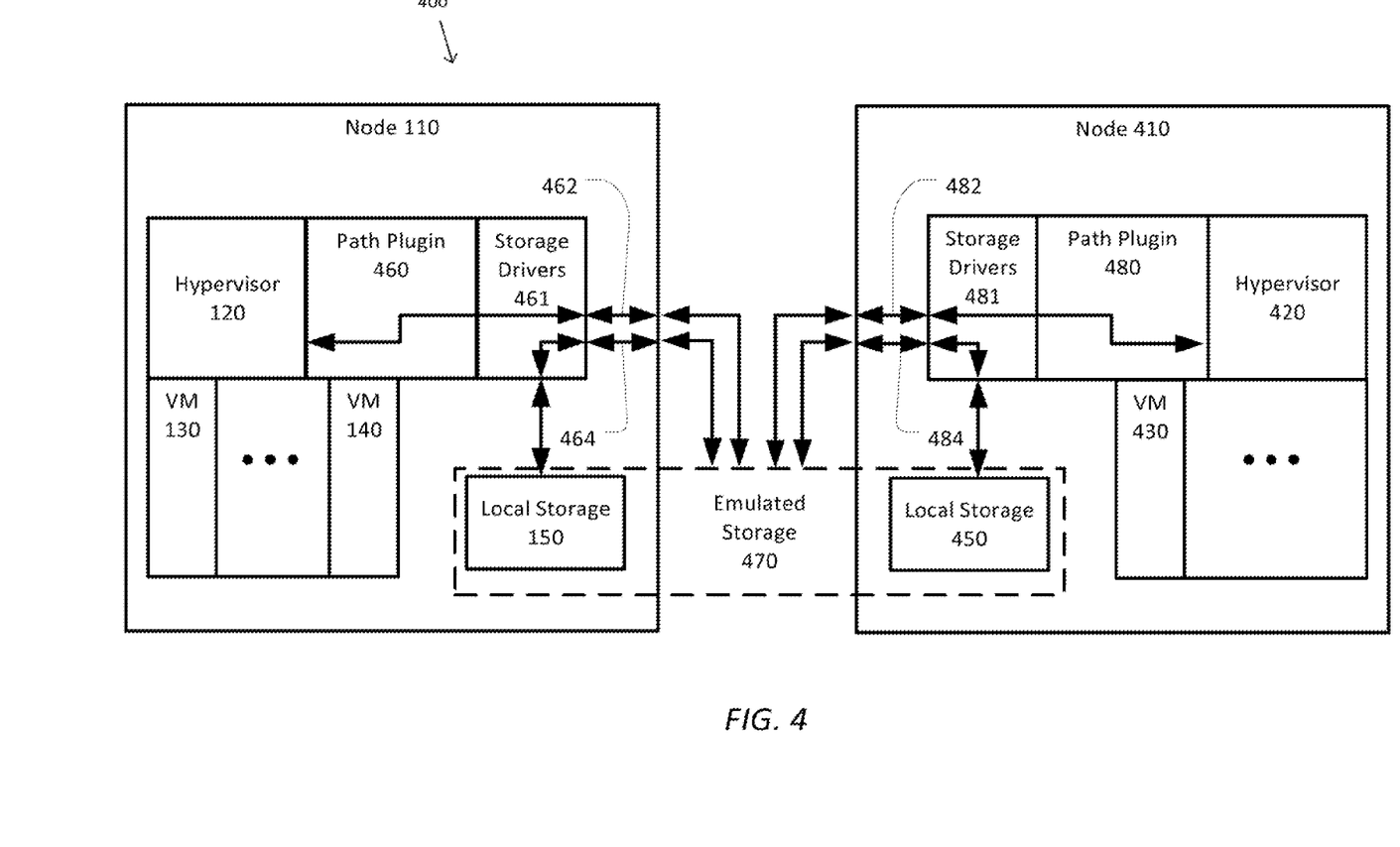
FIG. 4 is a simplified diagram of an example computing system using path plugins to emulate a shared storage device according to some embodiments.

FIG. 4 is a simplified diagram of an example computing system 400 using path plugins to emulate a shared storage device 470 according to some embodiments. As shown in FIG. 4, computing system 400 includes two nodes 110 and 410. Node 110 is largely unchanged from FIGS. 1 and 3 and includes hypervisor 120 hosting VMs 130 and 140. Similarly, node 410 includes a hypervisor 420. Hypervisor 420 is also hosting a VM 430. Like VMs 130 and 140, VM 430 may be running its own operating system and applications. Node 410 is further host to its own local storage device 450.

Referring back to node 110, a path plugin 460 may be used to intercept storage device requests being handled by hypervisor 120 and storage drivers 461. However, unlike path plugin 310 of FIG. 3, path plugin 460 is using local storage device 150 to emulate the shared storage device 470. More specifically, whenever an access is made to local storage device 150, using its storage unit ID, path plugin 460 may intercept the access and redirect it to the emulated shared storage device 470. Thus, accesses using the storage unit ID of local storage device 150 are instead directed through storage drivers 461 to the emulated shared storage device 470 using a path 462. In cases where the accesses request meta information for local storage device 150, the storage drivers 461 of the emulated shared storage device 470 respond by identifying local storage device 150 as a shared storage device. For read and write requests, the storage drivers for the emulated shared storage device 470 may direct the request to local storage device 150 using a path 464. Responses to the read and write requests may return back to storage drivers 125 via paths 464 and 462 as provided by path plugin 460.

A similar arrangement is included in node 410. A path plugin 480 may be used to intercept storage device requests being handled by hypervisor 420 and storage drivers 481. To support the use of local storage device 450 with the emulated shared storage device 470, local storage device 450 is associated with the same storage unit ID as local storage device 150 and the emulated shared storage device 470. More specifically, whenever an access is made to local storage device 450, using the shared storage unit ID, path plugin 480 may intercept the access and redirect it to the emulated shared storage device 470. Thus, accesses using the shared storage unit ID assigned to local storage device 450 are instead directed to the storage drivers 481 of the emulated shared storage device 470 using a path 482. In cases where the accesses request meta information, the storage drivers 481 of the emulated shared storage device 470 respond by identifying local storage device 450 as a shared storage device. For read and write requests, the storage drivers 481 for the emulated shared storage device 470 may direct the request to local storage device 450 using a path 484, or, when appropriate, to local storage device 150 using the path 464. Similarly, appropriate read and write requests received from path plugin 460 on path 462 may be sent to local storage device 450 before the result is returned to storage drivers 125 of node 110.

Thus, even though the emulated shared storage device 470 appears to be a shared storage device, path plugins 460 and 480 permit the emulated shared storage device 470 to be backed by local storage devices 150 and 450 in separate nodes. This allows local storage devices to emulate shared storage, but also allows VMs accessing local storage devices 150 or 450 to be migrated between nodes 110 and 410 without being prohibited by hypervisors 120 and 420, because the emulated shared storage device 470 appears to be a shared storage device to hypervisors 120 and 420. The path plugins 460 and 480 and the storage drivers of the emulated shared storage device 470 provide further flexibility in how data on the local storage device of a source node may be made available to a selected VM after it is migrated to a target node. Depending upon the type and volume of this data, any requests made in the target node for data in the local storage device of the source node may be reported as unavailable, provided via a remote access, and/or moved on demand to the local storage device of the target node.

As discussed above and further emphasized here, FIG. 4 is merely an example which should not unduly limit the scope of the claims. One of ordinary skill in the art would recognize many variations, alternatives, and modifications. As shown in the embodiments of FIG. 4, the emulated shared storage device 470 is depicted as a storage device separate from nodes 110 and 410. The configuration of FIG. 4 is designed to best depict the concept of the emulated storage device 470, but does not reflect the many possible ways that the emulated shared storage device 470 can be implemented. In some examples, accesses made to the emulated shared storage device 470 by its storage unit ID may be directed to storage drivers and handlers in a storage node, separate from nodes 410 and 440, for processing. The storage node may be coupled to nodes 110 and 410 using a network, such as network 170. In some examples, accesses made to the emulated shared storage device may be directed for processing by storage drivers and handlers located in nodes 110 or 410. In some examples, accesses made to the emulated shared storage device 470 may be distributed among storage drivers and handlers in nodes 110 and 410. As needed, the storage drivers and handlers, whether located in the storage node or nodes 110 and 410 may direct the accesses to local storage devices 150 and 450. In some examples, the emulated shared storage device 470 may be backed by just one of the local storage devices 150 or 450. In some examples, the emulated shared storage device 470 may also be shared by three or more nodes, with each node supplying local storage devices as desired.

Figure 5:
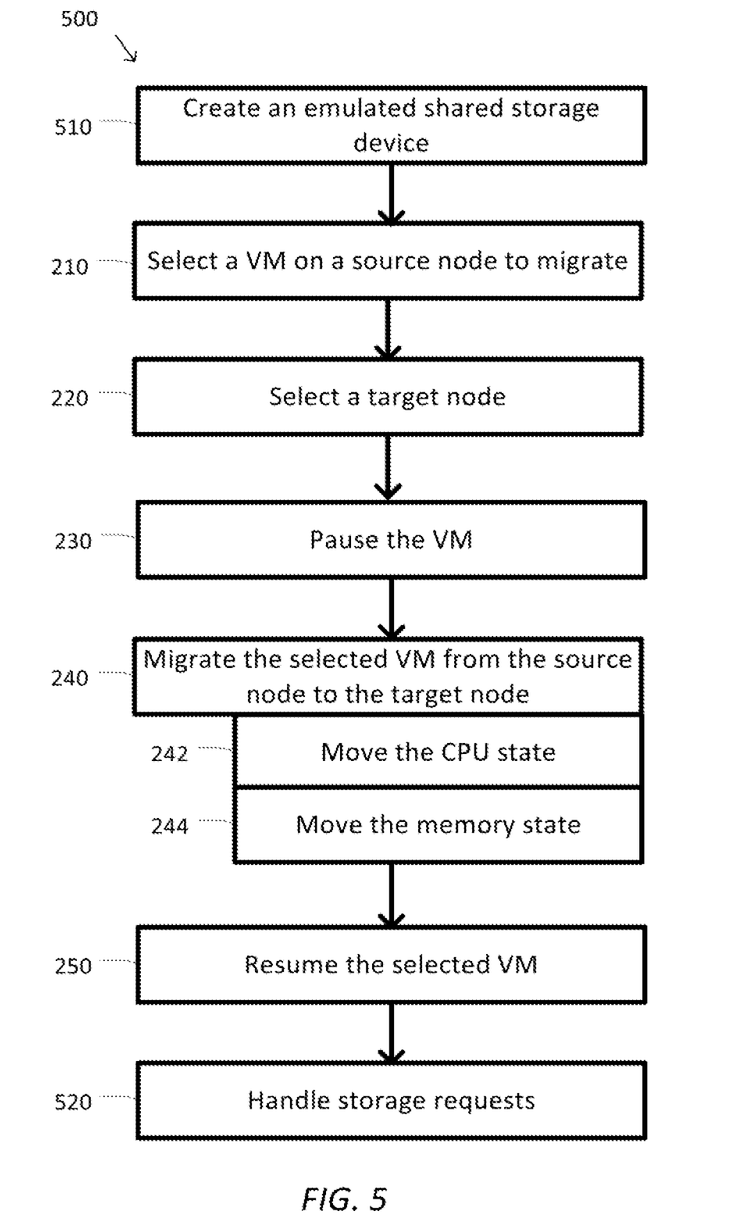
FIG. 5 is a simplified diagram of an example method of VM migration according to some embodiments.

FIG. 5 is a simplified diagram of an example method 500 of VM migration according to some embodiments. One or more of the processes 210-250 and 510-520 of method 500 may be implemented, at least in part, in the form of executable code stored on non-transient, tangible, machine readable media that when run by one or more processors (e.g., the one or more processors of nodes 110 and 410) may cause the one or more processors to perform one or more of the processes 210-250 and 510-520.

At the process 510, an emulated shared storage device, such as the emulated shared storage device 470, is created so that even though the selected VM may be using local storage devices it may be migrated without generating errors from the hypervisor of the target system. In some embodiments, the emulated shared storage device may be created when the various VMs and other storage devices are provisioned, by a hypervisor, such as hypervisor 120 or 420. In some examples, the hypervisor may perform the provisioning under direction of a storage manager or storage controller. In some embodiments, the emulated shared storage device may be created on demand when needed to support migration of a VM.

As with method 200 of FIG. 2, method 500 includes selecting a VM on a source node to migrate (process 210), selecting a target node (process 220), pausing the selected VM (process 230), and migrating the selected VM from the source node to the target node (process 240). The migration includes moving the CPU state (process 242) and the memory state (process 244), however, the migration of the local storage state (process 246) is omitted through use of the emulated shared storage device created during process 510.

At the process 250, the selected VM is resumed. After the selected VM is migrated to the target node, the selected VM may be resumed so that it may begin providing services from the target node. For example, the hypervisor managing the selected VM on the target node may be used to resume the selected VM.

At a process 520, storage requests are handled. After the selected VM is resumed in the target node during the process 250, the selected VM may begin making storage requests using the storage unit ID associated with the local storage device of the source node. Using the emulated shared storage device created during process 510, accesses are directed to the emulated shared storage device. Meta information requests using the storage unit ID may provide responses that indicate that the storage unit ID is associated with a shared storage device. Further, read and write requests using the storage unit ID may be handled using updated path handlers such that the appropriate local storage device of either the source node or the target node may handle the request. Actual handling of the read and write requests may be dependent upon a migration policy chosen for the local storage state as captured on the local storage device of the source node at the time of migration.

Figure 6:
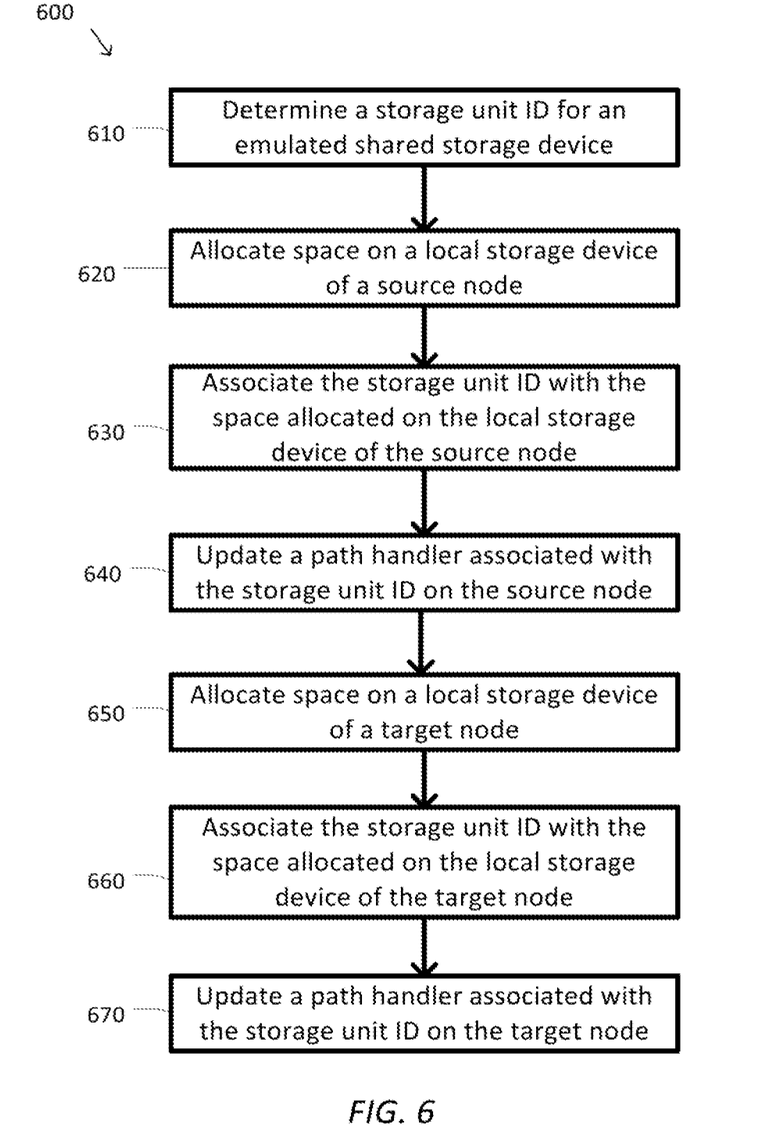
FIG. 6 is a simplified diagram of an example method for creating an emulated shared storage device according to some embodiments.

FIG. 6 is a simplified diagram of an example method 600 for creating an emulated shared storage device according to some embodiments. One or more of the processes 610-670 may be implemented, at least in part, in the form of executable code stored on non-transient, tangible, machine readable media that when run by one or more processors (e.g., the one or more processors of nodes 110 and 410) may cause the one or more processors to perform one or more of the processes 610-670. In some examples, method 600 may be included in process 510. In some embodiments, one or more of the processed of method 600 may be performed by or under the direction of a storage manager or a storage controller, such as the NetApp Virtual Storage Console.

At a process 610, a storage unit ID for an emulated shared storage device is determined. During use of the emulated shared storage device, the storage unit ID is used to direct storage requests to the storage drivers and handlers that emulate the emulated shared storage device. In some examples, when the emulated shared storage device is created during provisioning, the storage unit ID may be created or generated.

In some examples, when the emulated shared storage device is created on demand, the storage unit ID may be a storage unit ID previously associated with space allocated on a local storage device on a source node. For example, the previously assigned storage unit ID may be determined by a hypervisor on the source node. In some examples, the hypervisor of the source node may maintain a list of storage unit IDs being accessed by the selected VM and an API may be used to record the storage unit ID associated with the local storage device.

At a process 620, space is allocated on a local storage device of the source node. Depending upon the local storage requirements of a VM using the emulated shared storage device, space on the local storage device of the source node may be allocated to support the VM. These storage requirements may include space to support caching of network storage devices and/or to provide swap space for virtual memory used by the VM. In some cases, process 620 may result in an error when the local storage device includes insufficient space to meet the desired storage requirements. When the emulated shared storage device is created on demand, the process 620 may be omitted.

At a process 630, the storage unit ID is associated with the space allocated on the local storage device on the source node. Use of the storage unit ID associated with the emulated shared storage device may avoid migration problems with the hypervisor of the target node. When the emulated shared storage device is created on demand, the process 630 may be omitted.

At a process 640, a path handler associated with the storage unit ID on the source node is updated. As a first step in this process, the path handler is updated so that any meta information requests associated with the storage unit ID of the emulated shared storage device are intercepted so that the storage unit ID appears to be associated with a shared storage device rather than a local storage device. Second, the path handler is further updated to intercept any read and write requests using the storage unit ID so that appropriate storage drivers and handlers for an emulated shared storage device are used instead of the prior local storage drivers and handlers. When appropriate the emulated shared storage drivers and handlers may direct the read and write requests to the local storage device using the local storage drivers and handlers. In some cases, the emulated shared storage drivers and handlers may further permit read and write accesses for the local storage device to be received from nodes other than the source node. In some examples, a path plugin of the source node may detect storage requests including the storage unit ID and forward the requests to the updated path handler.

At a process 650, space is allocated on a local storage device of the target node. Depending upon the local storage requirements of the selected VM, storage on a local storage device of the target node may be allocated to support the selected VM. These storage requirements may include space to support caching of network storage devices and/or to provide swap space for virtual memory used by the selected VM. In some cases, process 650 may result in an error when the local storage device includes insufficient space to meet the desired storage requirements. When no space is requested on the target node, for example when the emulated shared storage device is to be backed only by the local storage device of the source node, the process 650 may be omitted.

At a process 660, the storage unit ID is associated with the space allocated on the local storage device of the target node. The storage unit ID determined during process 610, that is associated with the emulated shared storage device being created is also associated with the space allocated on the local storage device of the target node. This permits the space allocated on the local storage device of the target node to appear to be part of the same storage device as the space allocated on the local storage device of the source node. This helps prevent the hypervisor of the target node from blocking the migration of the selected VM to the target node as use of the same storage unit ID gives the appearance that that storage unit ID is associated with a shared storage device.

At a process 670, the path handler associated with the storage unit ID on the target node is updated. Similar to process 640, the path handler in the target node is updated to present the emulated shared storage device of the target node as a shared storage device and to intercept read, write, and informational requests made using the storage unit ID determined during process 610. In some examples, a path plugin of the target node may detect storage requests including the storage unit ID and forward the requests to the updated path handler.

Figure 7:
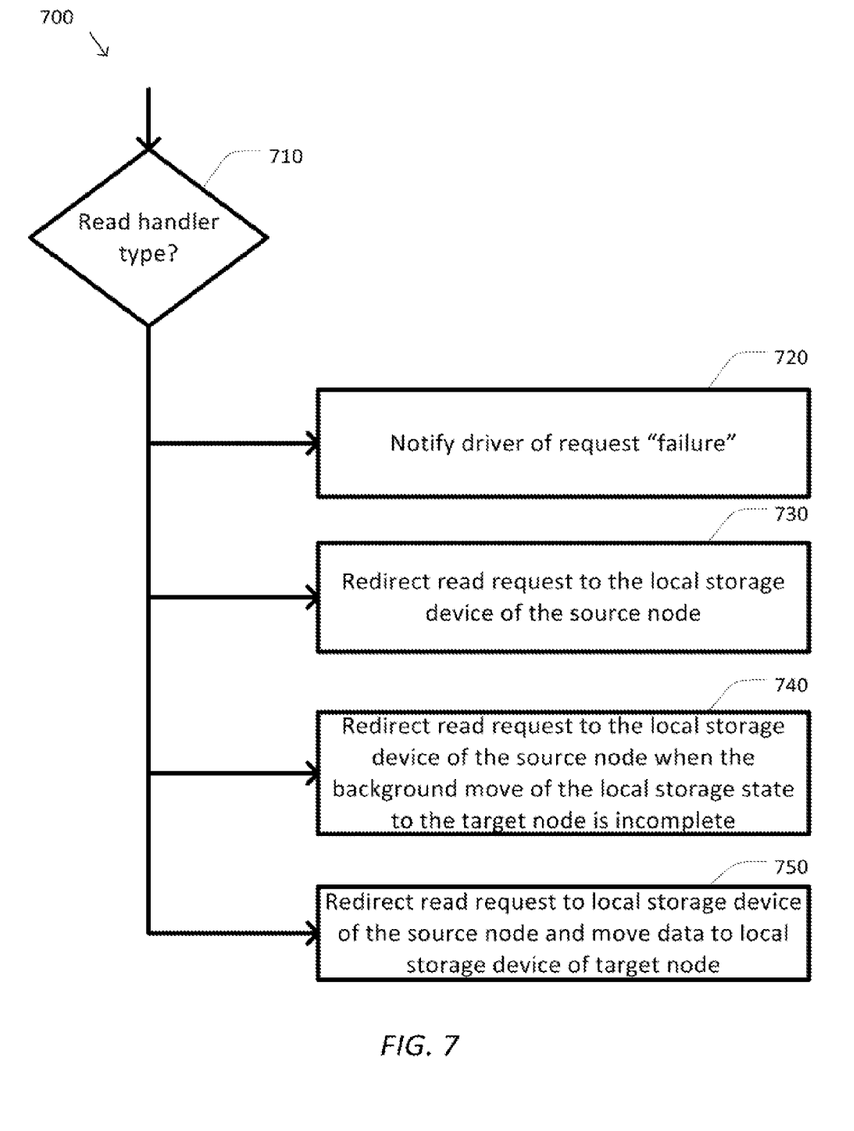
FIG. 7 is a simplified diagram of example process for handling read storage requests using an emulated shared storage device according to some embodiments.

FIG. 7 is a simplified diagram of example process 700 for handling read storage requests using an emulated shared storage device according to some embodiments. One or more of the processes 710-750 may be implemented, at least in part, in the form of executable code stored on non-transient, tangible, machine readable media that when run by one or more processors (e.g., the one or more processors of nodes 110 and 410) may cause the one or more processors to perform one or more of the processes 710-750. As an example, process 700 may handle read requests received during process 520 by the storage drivers and path handlers of the target node.

At a process 710, a type of read handler is determined. Depending upon how read requests made to the emulated shared storage device from the target node are to be handled, different read handlers may be used to handle the read requests. In some examples, the read handler may be applied to any read requests made to the emulated shared storage device and in other examples the read handler may depend on which location of the emulated shared storage device is being accessed.

At a process 720, a driver is notified of a failure in the request. When a read request is made to the emulated shared storage device from the target node and the requested data is stored on the local storage device of the target node, the request is handled successfully. However, when the requested data is not stored on the local storage device of the target node, the read handler notifies the requesting driver of a failure in the request. More specifically, the read handler may notify the requesting driver that the requested data is not available on the emulated shared storage device. When the emulated shared storage device is being used as a local caching device for a network storage device, this may not actually be an error and may simply indicate to the driver that a cache miss has occurred. When this is the case, the driver may process the cache miss normally by requesting the desired data from the network storage device and, when the desired data is received from the network storage device, a copy may be cached locally using the emulated shared storage device so that future requests of this data may be handled successfully. Thus, the read handler of process 720 moves no data in the local storage state from the source node to the target node and makes none of the local storage state from the source node available at the target node.

At a process 730, the read request is redirected to the local storage device of the source node. When a read request is made to the emulated shared storage device from the target node and the requested data is stored on the local storage device of the target node, the request is handled successfully. However, when the requested data is not stored on the local storage device of the target node, the read request is forwarded to the local storage device of the source node. Once received at the source node, the read request is handled by the path handler for the emulated shared storage device there and the result is read from the local storage device of the source node and returned back to the path handler for the emulated shared storage device in the target node. This type of read handler uses the local storage device of the source node as a remote/network storage device for the target node. In some examples, this type of read handler may be suitable when no local storage is allocated to the emulated shared storage device in the target node. Thus, the read handler of process 730 moves no data in the local storage state from the source node to the target node, but does make requested portions of the local storage state from the source node available at the target node on demand.

At a process 740, the read request is redirected to the local storage device of the source node when the background move of the local storage state to the target node is incomplete. When migration of the selected VM includes moving the local storage state from the source node to the target node, the movement of the local storage state may be done in the background. In many cases this may be done in order to support more rapid resumption of the selected VM using process 250 even though the local storage state has not been fully moved between the source and target nodes. Using this type of read handler, when the requested data is already moved to the local storage device of the target node, the request is handled successfully using the local storage device of the target node. When the data is not yet moved, the read request is redirected to the local storage device of the source node using a process similar to process 730. Thus, the read handler of process 740 moves data in the local storage state from the source node to the target node and makes as yet unmoved data available at the target node on demand.

At a process 750, the read request is redirected to the local storage device of the source node and the data is moved to the local storage device of the target node. When a read request is made to the emulated shared storage device from the target node and the requested data is stored on the local storage device of the target node, the request is handled successfully. However, when the requested data is not stored on the local storage device of the target node, the read request is redirected to the local storage device of the source node using a process similar to process 730. In addition, once the requested data is returned to the target node, it is also stored on the local storage device of the target node so that subsequent read requests of this data may be handled in the target node. Thus, the read handler of process 750 moves data in the local storage state from the source node to the target node upon demand.

The scope of embodiments is not limited to the processes shown in FIG. 7. According to certain embodiments, the process 700 may be adapted to handle requests other than read requests made on the target node. In some examples, read requests made to the emulated shared storage device from the source node may be handled using variations of process 700. In some examples, process 700 may be adapted to handle write requests made in either the source node or the target node using write-through or write-back policies.

As an example, in the context of the computing system 400 depicted in FIG. 4, method 500 of VM migration may be used to migrate VM 140 from source node 110 to target node 410. Process 510 may be used to create the emulated shared storage device 470. The storage unit ID of the emulated shared storage device 470 is determined during process 610 and assigned to the local storage device 150 using process 620. This includes updating the path handlers associated with path plugin 460 using process 640 to create the paths 462 and 464 between local storage device 150 and the emulated shared storage device 470. The storage unit ID of the emulated shared storage device 470 is then associated with local storage device 450 of target node 450 and the path handlers in path plugin 480 are updated using process 670 to create the paths 482 and 484 between local storage device 450 and the emulated shared storage device 470. As necessary, storage may also be allocated on the local storage device 150 and the local storage device 450 using processes 630 and 660, respectively. After VM 140 is paused on source node 110 using process 240, the CPU state and the memory state of VM 140 may be moved to target node 410 using processes 242 and 244. Thus, any storage requests made by VM 140 during process 520 in either node 110 or node 410 are directed to what appears to be the emulated shared storage device 470.

Some examples of nodes 110 and 410 may include non-transient, tangible, machine readable media that include executable code that when run by one or more processors may cause the one or more processors to perform the processes of methods 200, 500, 600, and/or 700 as described above. Some common forms of machine readable media that may include the processes of methods 200, 500, 600, and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to some embodiments, the emulation capabilities of the emulated shared storage device 470 and the method 500 may be adapted to emulating other types of storage devices. The redirection of paths using the path handlers and path plugins may permit the emulation of any type of network storage devices other than shared storage devices. For example, the emulation techniques may be used to convert a local storage device with local storage drivers into a network storage device. As another example, the emulation techniques may be used to convert a number of very different local storage devices into an apparent single storage device. In yet other examples, the emulated techniques may be used to provide a storage device with drivers of a different type, such that a SCSI-base storage device may appear to be a PCIe-based storage device, etc.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of emulating a shared storage device in a distributed computing system, the method comprising:
   determining a storage unit identifier (ID) associated with a first local storage device in a first node of the distributed computing system;
   updating a first path handler to intercept first storage requests including the storage unit ID at the first node and forwarding the first storage requests to first storage drivers for an emulated shared storage device;
   associating a second local storage device in a second node of the distributed computing system with the storage unit ID;
   updating a second path handler to intercept second storage requests including the storage unit ID at the second node and forwarding the second storage requests to second storage drivers for the emulated shared storage device; and
   intercepting the second storage requests including the storage unit ID and being made on the second node and forwarding the second storage requests to the second storage drivers for the emulated shared storage device.

2. The method of claim 1, further comprising forwarding the second storage requests intercepted on the second node to a selected second storage driver on the second node to access the second local storage device.

3. The method of claim 1 wherein the first path handler is associated with a first path plugin on the first node and the second path handler is associated with a selected second storage driver on the second node.

4. The method of claim 1 wherein the first path handler is associated with a first hypervisor executing on the first node and the second path handler is associated with a second hypervisor executing on the second node.

5. The method of claim 1 wherein the second storage requests intercepted on the second node originated from an application or an operating system executing on a first virtual machine being hosted on the second node.

6. The method of claim 5, further comprising migrating the first virtual machine from the first node to the second node.

7. The method of claim 1 further comprising responding, by the second storage drivers of the emulated shared storage device, to the second storage requests intercepted on the second node by providing meta information consistent with a shared storage device, wherein the second storage requests intercepted on the second node include informational requests.

8. The method of claim 1 further comprising notifying a requesting driver of a failure when data associated with the second storage requests intercepted on the second node is not stored on the second local storage device, wherein the second storage requests intercepted on the second node include a read request.

9. The method of claim 1 further comprising forwarding the second storage requests intercepted on the second node to a selected first storage driver on the first node when data associated with the second storage requests intercepted on the second node is not stored on the second local storage device, wherein the second storage requests intercepted on the second node includes a read request.

10. The method of claim 9, further comprising:
    accessing the first local storage device and reading the data associated with the read request; and
    returning the data associated with the read request to the second path handler.

11. The method of claim 10, further comprising storing the data associated with the read request on the second local storage device.

12. The method of claim 1 wherein the second storage requests intercepted on the second node include write requests.

13. A system for emulating a shared storage device, the system comprising:
    a distributed computing system including a first node and a second node;

the first node including a first local storage device associated with a storage unit identifier (ID) and a first processor for executing first storage requests;

a first path handler configured to intercept the first storage requests including the storage unit ID, the first storage requests being created by a first virtual machine and being forwarded to first drivers for an emulated shared storage device associated with the storage unit ID;

the second node including a second local storage device associated with the storage unit ID and a second processor for executing second storage requests; and a second path handler configured to intercept the second storage requests including the storage unit ID, the second storage requests being created by a second virtual machine and being forwarded to second drivers for the emulated shared storage device.

14. The system of claim 13, further comprising a network for coupling the first node to the second node.

15. A non-transitory computer readable storage medium containing executable program instructions configured to be executed by a processor and further configured to be stored on the computer readable storage medium, the computer readable storage medium comprising:

program instructions that create an emulated shared storage unit;

program instructions that select a virtual machine (VM) being hosted on a source platform of the cloud computing system, the selected VM accessing a first local storage unit of the source platform, the first local storage unit being associated with a logical unit number (LUN);

program instructions that select a target platform of the cloud computing system;

program instructions that pause the selected VM;

program instructions that migrate the selected VM from the source platform to the target platform by moving a CPU state and a memory state of the selected VM from the source platform to the target platform;

program instructions that resume the selected VM on the target platform; and program instructions that direct selected storage operations associated with the LUN and being created by the selected VM on the target platform to the emulated shared storage unit;

wherein program instructions that create the emulated shared storage unit further comprising:

program instructions that determine the LUN associated with the first local storage unit;

program instructions that update a first path plugin to intercept first storage operations associated with the LUN, the first storage operations being created on the source platform and being directed to first handlers for the emulated shared storage unit;

program instructions that associate a second local storage unit of the target platform with the LUN; and program instructions that update a second path plugin to intercept second storage operations associated with the LUN, the second storage operations being created on the target platform and being directed to second handlers for the emulated shared storage unit.

16. The non-transitory computer readable storage medium of claim 15, further comprising program instructions that intercept the selected storage operations associated with the LUN and being made by the selected VM and directing the selected storage operations to the second handlers for the emulated shared storage unit.

17. The non-transitory machine-readable medium of claim 16 further comprising:

program instructions that read second data from the second local storage unit when the second data associated with the second storage operations intercepted on the target platform is stored on the second local storage unit;

program instruction that read first data from the first local storage unit when the second data associated with the second storage operations intercepted on the target computer is not stored on the second local storage unit; and program instructions that return the first data and the second data to the selected VM, wherein the second storage operations intercepted on the target computer include a read operation.

* * * * *